(12) United States Patent
Xu et al.

(10) Patent No.: US 11,283,566 B2
(45) Date of Patent: Mar. 22, 2022

(54) SYSTEMS AND METHODS FOR USER EQUIPMENT COOPERATION

(71) Applicant: Huawei Technologies Co., Ltd., Shenzhen (CN)

(72) Inventors: Hua Xu, Ottawa (CA); Jianglei Ma, Ottawa (CA); Liqing Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 73 days.

(21) Appl. No.: 16/743,597

(22) Filed: Jan. 15, 2020

(65) Prior Publication Data

US 2020/0235876 A1    Jul. 23, 2020

Related U.S. Application Data

(60) Provisional application No. 62/794,261, filed on Jan. 18, 2019.

(51) Int. Cl.
*H04L 5/00* (2006.01)
*H04L 1/00* (2006.01)
*H04W 72/04* (2009.01)

(52) U.S. Cl.
CPC .......... *H04L 5/0048* (2013.01); *H04L 1/0013* (2013.01); *H04W 72/0466* (2013.01)

(58) Field of Classification Search
CPC combination set(s) only.
See application file for complete search history.

(56) References Cited

U.S. PATENT DOCUMENTS

2016/0212780 A1* 7/2016 Stojanovski .......... H04W 8/005
2016/0249355 A1* 8/2016 Chae .................... H04L 5/0091
(Continued)

FOREIGN PATENT DOCUMENTS

| CN | 107113593 A | 8/2017 |
| CN | 109120314 A | 1/2019 |

OTHER PUBLICATIONS

"3rd Generation Partnership Project; Technical Specification Group Services and System Aspects; Proximity-based services (ProSe); Stage 2 (Release 15)". Technical specification. 3GPP TS 23.303 V15.1.0. Jun. 2018, 130 pages.
(Continued)

*Primary Examiner* — Jung Liu
*Assistant Examiner* — Jung-Jen Liu
(74) *Attorney, Agent, or Firm* — Slater Matsil, LLP

(57) ABSTRACT

Aspects of the present application provide methods and devices for use in User Equipment (UE) cooperation. A packet transmitted between a base station and a UE or between UEs includes a packet destination identifier that identifies a destination of the packet. A receiving packet from a base station or another UE can determine whether the UE is the destination of the packet. When the UE is the destination of the packet, the UE decodes the packet. When the UE is not the destination of the packet, the UE forwards the packet to another UE. The packet may include a packet source identifier that can be used by the destination to determine where the packet originated. In some instances, the cooperative UEs do not need to decode the entire packet to be able to determine the destination of the packet and therefore can forward the packet along with less processing.

22 Claims, 8 Drawing Sheets

(56) References Cited

U.S. PATENT DOCUMENTS

| | | | |
|---|---|---|---|
| 2018/0054237 A1* | 2/2018 | Tseng | H04W 36/0033 |
| 2018/0070264 A1* | 3/2018 | Saiwai | H04W 72/04 |
| 2018/0146491 A1* | 5/2018 | Kim | H04W 28/0268 |
| 2018/0235027 A1* | 8/2018 | Adachi | H04W 72/0406 |
| 2018/0255444 A1* | 9/2018 | Chae | H04L 5/0044 |
| 2019/0014490 A1* | 1/2019 | Kim | H04W 24/02 |
| 2019/0215817 A1* | 7/2019 | Chae | H04W 4/70 |
| 2019/0261309 A1* | 8/2019 | Martin | H04W 52/0229 |
| 2019/0363779 A1* | 11/2019 | Chae | A01D 3/04 |
| 2020/0084592 A1* | 3/2020 | Gulati | H04W 76/11 |
| 2020/0100048 A1* | 3/2020 | Wu | H04L 5/0055 |
| 2020/0100088 A1* | 3/2020 | Kim | H04W 88/04 |
| 2020/0100167 A1* | 3/2020 | Cheng | H04W 4/40 |
| 2020/0119849 A1 | 4/2020 | Su et al. | |
| 2020/0146000 A1* | 5/2020 | Shin | H04L 5/0053 |
| 2020/0187298 A1* | 6/2020 | Chun | H04W 28/0215 |
| 2021/0144528 A1* | 5/2021 | Chae | H04W 72/0406 |
| 2021/0258988 A1* | 8/2021 | Balakrishnan | H04W 24/10 |

OTHER PUBLICATIONS

Huawei, HiSilicon:"Sidelink physical layer procedures for NR V2X", 3GPP TSG RAN WG1 Ad-Hoc Meeting 1901, R1-1900023, Taipei, Jan. 21-25, 2019, total 13 pages.

Spreadtrum Communications:"Consideration on sidelink unicast, groupcast and broadcast", 3GPP TSG RAN WG1 Meeting #94bis, R1-1811009, Chengdu, China, Oct. 8-12, 2018, total 5 pages.

\* cited by examiner

US 11,283,566 B2

SYSTEMS AND METHODS FOR USER EQUIPMENT COOPERATION

RELATED APPLICATIONS

This application claims the benefit of priority of U.S. Provisional Patent Application 62/794,261 filed on Jan. 18, 2019, which is hereby incorporated by reference in its entirety.

TECHNICAL FIELD

The present disclosure relates generally to wireless communications, and in particular embodiments, to User Equipment (UE) cooperation.

BACKGROUND

In some wireless communication systems, user equipments (UEs) wirelessly communicate with a base station to send data to the base station and/or receive data from the base station. A wireless communication from a UE to a base station is referred to as an uplink (UL) communication. A wireless communication from a base station to a UE is referred to as a downlink (DL) communication. A wireless communication from a first UE to a second UE is referred to as a sidelink (SL) communication or device-to-device (D2D) communication.

Resources are required to perform uplink, downlink and sidelink communications. For example, a base station may wirelessly transmit data, such as a transport block (TB), to a UE in a downlink transmission at a particular frequency and over a particular duration of time. The frequency and time duration used are examples of resources.

UE cooperation has been proposed to enhance reliability, throughput and capacity. For example, UE cooperation can be used to provide diversity in space, time and frequency, and increase the robustness against fading and interference. In UE cooperation, SL communications are used to establish joint UE reception, where some of the UEs, referred to as cooperating UEs (CUEs), act as relays for other UEs, referred to as target UEs (TUEs) to improve system throughput and coverage. However, joint UE reception using SL communications can also increase the complexity of the network communications, such as for hybrid-automatic repeat request (HARQ) signaling. The HARQ mechanism is a link adaptation technique that can improve communications for erroneous data packets in wireless communication networks.

SUMMARY

Aspects of the present disclosure provide, for use with a group of UEs, using a packet destination identifier and optionally a packet source identifier in UE cooperation. The benefit of using the packet destination identifier is to avoid the ambiguity of the destination of the packet and thus the cooperating UE (CUE) and the target UE (TUE) in the UE group know how to better handle the packet, by either forwarding it or decoding it. In some embodiments, it also avoids a privacy concern that the other UEs may decode the data before forwarding it. In some embodiments, methodologies described herein could save the UE power in unnecessary decoding of data that is not intended for the UE.

According to an aspect of the disclosure, there is provided a method involving receiving, by a first UE of a group of UEs, a packet comprising a packet destination identifier that identifies a destination of the packet and forwarding, by the first UE, the packet to a second UE or a base station based on the packet destination identifier without decoding the entire packet.

In some embodiments, the packet destination identifier is included in a self-contained bit field or code block of the packet, the self-contained bit field or code block for identifying one or more UEs in the group of UEs or a base station as a destination of the packet.

In some embodiments, the self-contained bit field or code block is multiplexed with the data portion by puncturing or rate matching the data portion.

In some embodiments, the packet destination identifier is included in a self-contained sequence, of a set of self-contained sequences, in a data portion of the packet, the self-contained sequence for identifying one or more UEs in the group of UEs or a base station as a destination of the packet.

In some embodiments, the self-contained sequence is multiplexed with the data portion by puncturing or rate matching the data portion.

In some embodiments, the packet destination identifier is included in a scrambled demodulation reference signal (DMRS) for identifying one or more UEs in the group of UEs or a base station as a destination of the packet.

In some embodiments, the packet further includes a packet source identifier that identifies a source of the packet, and the packet source identifier is included in a self-contained bit field or code block of the packet, the self-contained bit field or code block for identifying the base station or one UE in the group of UEs as a source of the packet.

In some embodiments, the packet further includes a packet source identifier that identifies a source of the packet, and the packet source identifier is included in a self-contained sequence, of a set of self-contained sequences, in a data portion of the packet, the self-contained sequence for identifying the base station or one UE in the group of UEs as a source of the packet.

In some embodiments, the self-contained sequence is multiplexed with the data portion by puncturing or rate matching the data portion.

In some embodiments, the packet source identifier is included in a scrambled demodulation reference signal (DMRS) for identifying the base station or one UE in the group of UEs as a source of the packet.

In some embodiments, the packet further comprises a UE group identifier or a target UE identifier (TUE ID).

According to an aspect of the disclosure, there is provided a user equipment (UE) including a processor and a computer-readable medium having stored thereon computer-executable instructions. The computer-executable instructions, when executed by the processor, cause the UE to receive a packet comprising a packet destination identifier that identifies a destination of the packet and forward the packet to a second UE or a base station based on the packet destination identifier without decoding the entire packet.

In some embodiments, the packet destination identifier is included in a self-contained bit field or code block of the packet, the self-contained bit field or code block for identifying one or more UEs in a group of UEs or a base station as a destination of the packet.

In some embodiments, the self-contained bit field or code block is multiplexed with the data portion by puncturing or rate matching the data portion.

In some embodiments, the packet destination identifier is included in a self-contained sequence, of a set of self-contained sequences, in a data portion of the packet, the self-contained sequence for identifying one or more UEs in a group of UEs or a base station as a destination of the packet.

In some embodiments, the self-contained sequence is multiplexed with the data portion by puncturing or rate matching the data portion.

In some embodiments, the packet destination identifier is included in a scrambled demodulation reference signal (DMRS) for identifying one or more UEs in a group of UEs or a base station as a destination of the packet.

In some embodiments, the packet further includes a packet source identifier that identifies a source of the packet, and the packet source identifier is included in a self-contained bit field or code block of the packet, the self-contained bit field or code block for identifying the base station or one UE in a group of UEs as a source of the packet.

In some embodiments, the packet further includes a packet source identifier that identifies a source of the packet, and the packet source identifier is included in a self-contained sequence, of a set of self-contained sequences, in a data portion of the packet, the self-contained sequence for identifying the base station or one UE in a group of UEs as a source of the packet.

In some embodiments, the self-contained sequence is multiplexed with the data portion by puncturing or rate matching the data portion.

In some embodiments, the packet source identifier is included in a scrambled demodulation reference signal (DMRS) for identifying the base station or one UE in a group of UEs as a source of the packet.

In some embodiments, the packet further comprises a UE group identifier or a target UE identifier (TUE ID).

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

Figure 1:
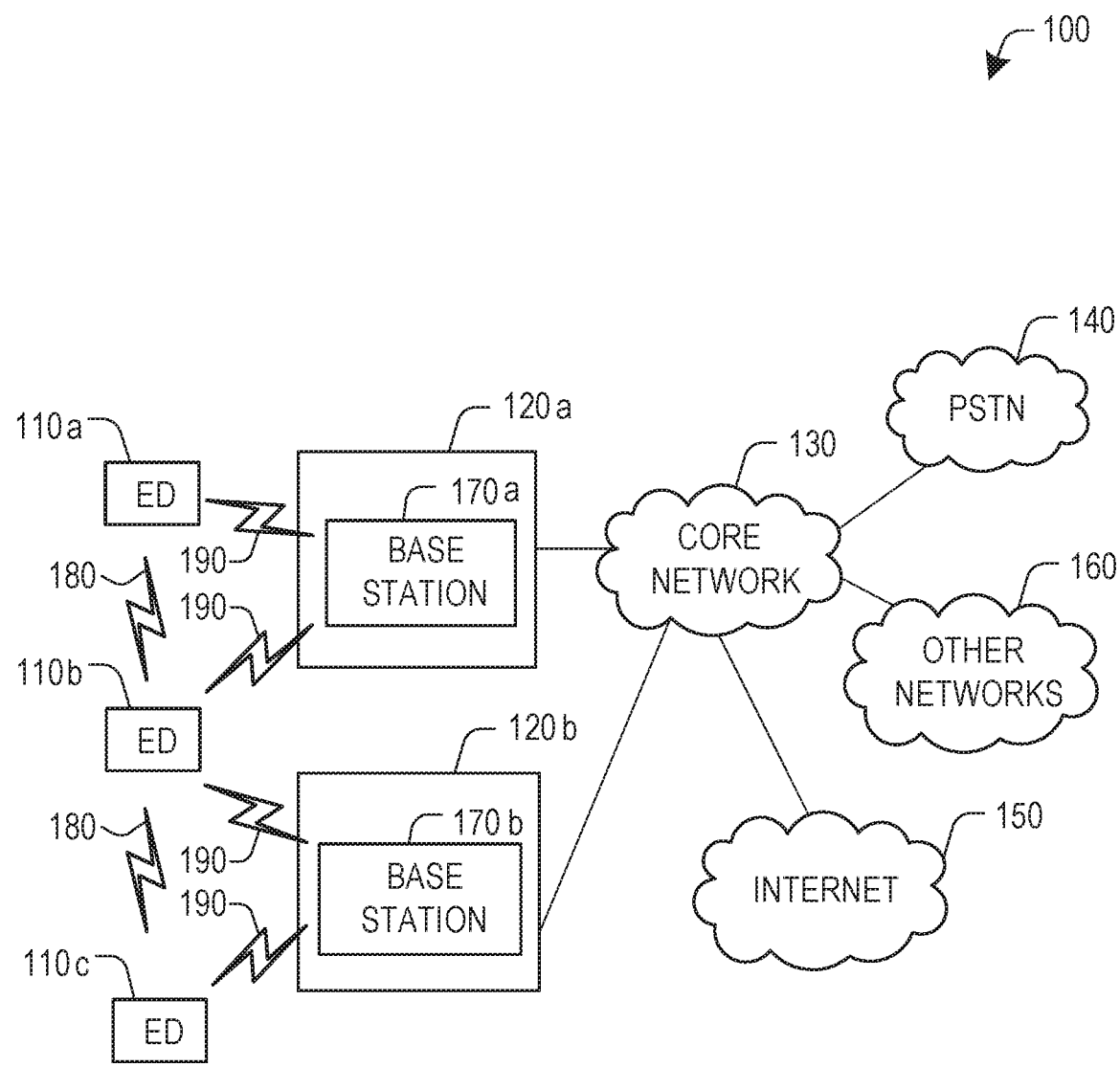
FIG. 1 is a schematic diagram of a communication system in which embodiments of the disclosure may occur.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

UE cooperation can enhance the system by potentially improving coverage and capacity. UE cooperation can also improve the latency and reliability of the system. The UE cooperation can be achieved by a group of UEs helping each other with the Uu interface link transmission and sidelink (SL) transmission. The Uu interface link is the interface that allows data transfer between the base station and a UE. Embodiments of the present disclosure aid in providing coordination and cooperation among UE(s) in the group of UEs in terms of transmission and reception by providing a manner for each transmitted/received message to be identified based on a packet destination identifier and a packet source identifier. A UE in the group can identify whether it is the destination UE, or not, based on the packet destination identifier, in some embodiments without decoding the entire packet. If the UE is the destination UE, the UE can then decode the entire packet. If the UE is not the destination UE, the UE can forward the packet to the destination UE or a UE in a path to the destination UE or simply other UEs in a UE group. In some embodiments, once the destination UE has received and decoded the packet, the destination UE can send a hybrid automatic repeat request acknowledgement (HARQ-ACK) back to the source acknowledging the packet has been received. The destination UE may send the HARQ-ACK to the source directly, or through one or more UEs in the group to the source. It should be emphasized that the packet destination identifier and the packet source identifier in this embodiment refer more to the identifiers that are inserted and transmitted along with physical channels such as physical control channel or physical shared channel. That is different from some identifiers that are contained in the data format from higher layers.

FIGS. 1, 2A, 2B and 3 following below provide context for the network and device that may be in the network and that may implement aspects of the present disclosure.

FIG. 1 illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 1, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Packet Uplink Access (HSUPA) or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160).

The EDs 110a-110c communicate with one another over one or more SL air interfaces 180 using wireless communication links e.g. radio frequency (RF), microwave, infrared (IR), etc. The SL air interfaces 180 may utilize any suitable radio access technology, and may be substantially similar to the air interfaces 190 over which the EDs 110a-110c communication with one or more of the base stations 170a-170c, or they may be substantially different. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the SL air interfaces 180. In some embodiments, the SL air interfaces 180 may be, at least in part, implemented over unlicensed spectrum.

In this disclosure, the SL transmissions between cooperating UEs may be "grant-free" transmissions or as a mode for data transmissions that are performed without communicating dynamic scheduling. Grant-free transmissions are sometimes called "configured grant", "grant-less", "schedule free", or "schedule-less" transmissions. Grant-free SL transmissions can also be referred to as SL "transmission without grant", "transmission without dynamic grant", "transmission without dynamic scheduling", or "transmission using configured grant", for example.

A configured grant transmission typically requires the receiver to know the parameters and resources used by the transmitter for the transmission. However, in the context of SL transmissions, the receiving UE is typically not aware of the transmitting UE's configuration parameters, such as which UE is transmitting, the ultimate target of the data (e.g., another UE), the time-domain and frequency-domain communication resources used for the transmission, and other control information. Various methods may be used to provide the configuration parameters and control information necessary for enabling configured grant transmissions in SL. The various methods will, however, each incur a respective overhead penalty. Embodiments of the present disclosure include at least some of those configuration parameters and/or control information in the SL configured grant transmission, which may provide performance and/or overhead benefits.

In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies, and incorporate multiple transceivers necessary to support multiple radio access technologies.

Figure 2A:
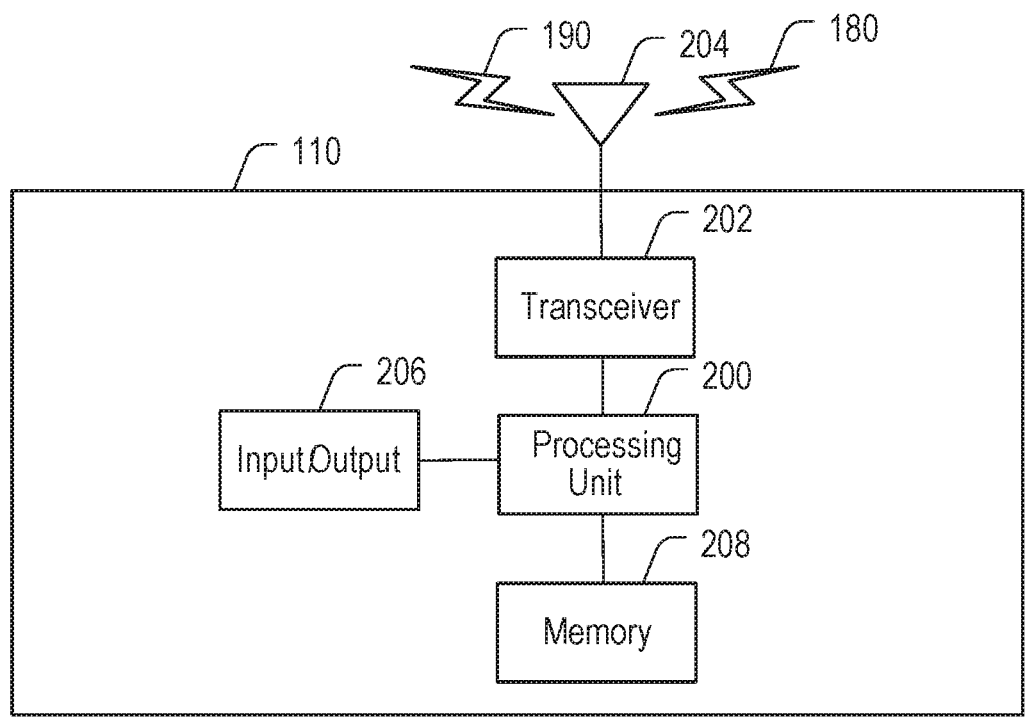
FIGS. 2A and 2B are block diagrams of an example user equipment and base station, respectively.
Figure 2B:
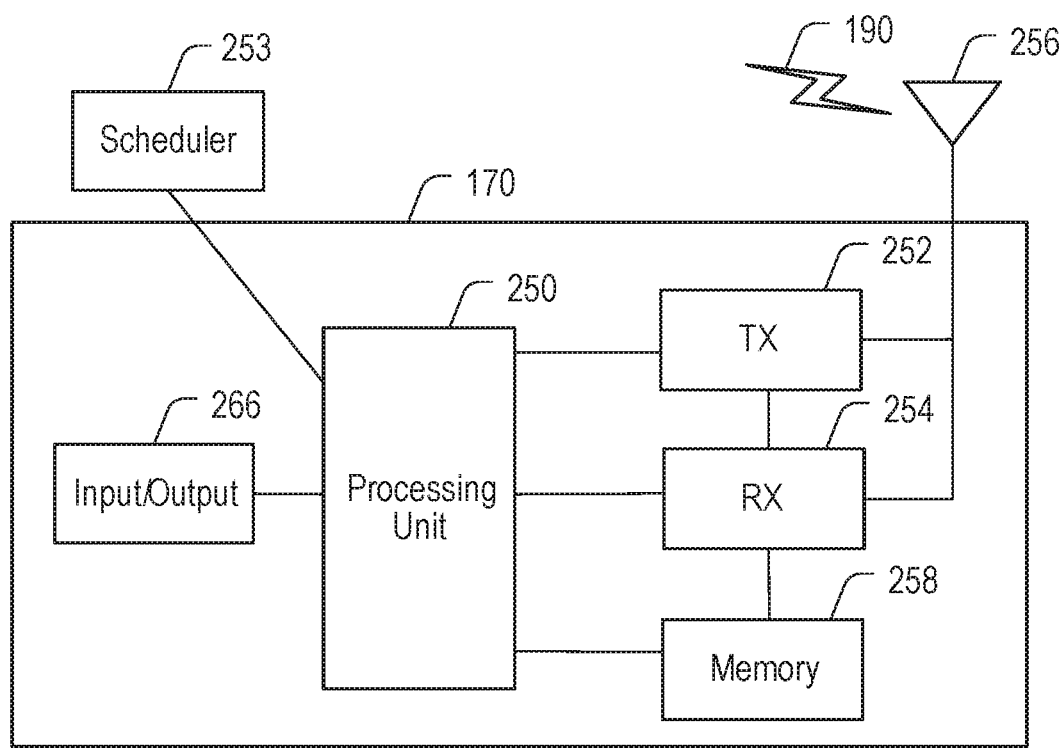

FIGS. 2A and 2B illustrate example devices that may implement the methods and teachings according to this disclosure. In particular, FIG. 2A illustrates an example ED 110, and FIG. 2B illustrates an example base station 170. These components could be used in the system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Additional details regarding the UEs 110 and the base stations 170 are known to those of skill in the art. As such, these details are omitted here for clarity.

Figure 3:
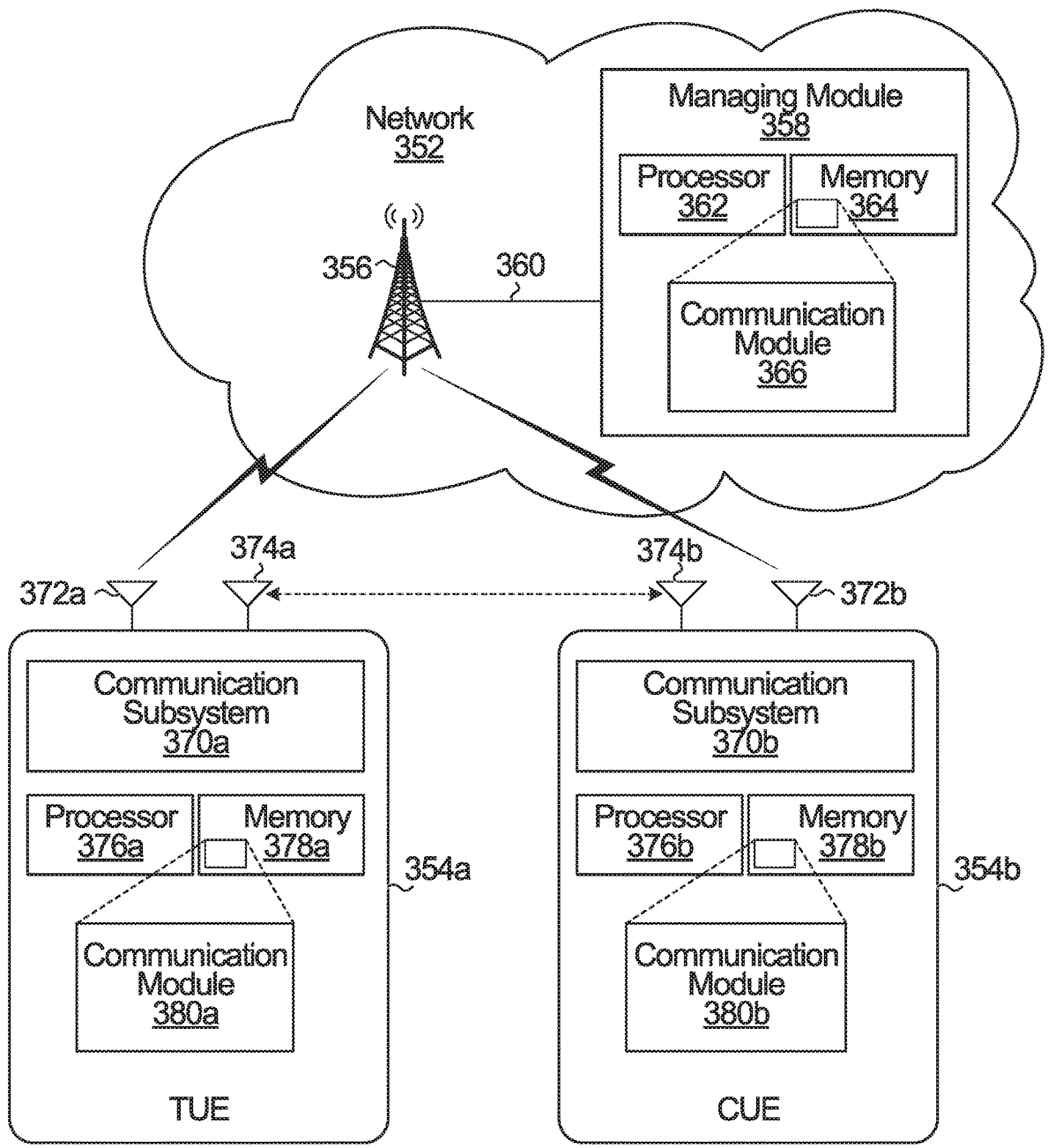
FIG. 3 is a block diagram illustrating an example of a network serving two UEs according to an aspect of the present disclosure.

FIG. 3 is a block diagram illustrating an example of a network 352 serving two UEs 354a and 354b, according to one embodiment. The two UEs 354a and 354b may be, for example, the two UEs 110a and 110b in FIG. 1. However, more generally this need not be the case, which is why different reference numerals are used in FIG. 3.

The network 352 includes a BS 356 and a managing module 358. The managing module 358 instructs the BS 356 to perform actions. The managing module 358 is illustrated as physically separate from the BS 356 and coupled to the BS 356 via a communication link 360. For example, the managing module 358 may be part of a server in the network 352. Alternatively, the managing module 358 may be part of the BS 356.

The managing module 358 includes a processor 362, a memory 364, and a communication module 366. The communication module 366 is implemented by the processor 362 when the processor 362 accesses and executes a series of instructions stored in the memory 364, the instructions defining the actions of the communication module 366. When the instructions are executed, the communication module 366 causes the BS 356 to perform the actions described herein so that the network 352 can establish, coordinate, instruct, and/or control a UE group. Alternatively, the communication module 366 may be implemented using dedicated circuitry, such as an application specific integrated circuit (ASIC) or a programmed field programmable gate array (FPGA).

The UE 354a includes a communication subsystem 370a, two antennas 372a and 374a, a processor 376a, and a memory 378a. The UE 354a also includes a communication module 380a. The communication module 380a is implemented by the processor 376a when the processor 376a accesses and executes a series of instructions stored in the memory 378a, the instructions defining the actions of the communication module 380a. When the instructions are executed, the communication module 380a causes the UE 354a to perform the actions described herein in relation to establishing and participating in a UE group. Alternatively, the module 380a may be implemented by dedicated circuitry, such as an ASIC or an FPGA.

The communication subsystem 370a includes processing and transmit/receive circuitry for sending messages from and receiving messages at the UE 354a. Although one communication subsystem 370a is illustrated, the communication subsystem 370a may be multiple communication subsystems. Antenna 372a transmits wireless communication signals to, and receives wireless communications signals from, the BS 356. Antenna 374a transmits SL communication signals to, and receives SL communication signals from, other UEs, including UE 354b. In some implementations there may not be two separate antennas 372a and 374a. A single antenna may be used. Alternatively, there may be several antennas, but not separated into antennas dedicated only to SL communication and antennas dedicated only to communicating with the BS 356.

SL communications could be over Wi-Fi, in which case the antenna 374a may be a Wi-Fi antenna. Alternatively, the SL communications could be over Bluetooth™, in which case the antenna 374a may be a Bluetooth™ antenna. SL communications could also or instead be over licensed or unlicensed spectrum.

The UE 354b includes the same components described above with respect to the UE 354a. That is, UE 354b includes communication subsystem 370b, antennas 372b and 374b, processor 376b, memory 378b, and communication module 380b.

The UE 354a is designated as a target UE (TUE) and will therefore be called TUE 354a. The UE 354b is a cooperating UE (CUE) and will therefore be called CUE 354b. The CUE 354b may be able to assist with wireless communications between the BS 356 and TUE 354a if a UE group were to be established that included TUE 354a and CUE 354b.

UE 354a may be specifically chosen as the target UE by the network 352. Alternatively, the UE 354a may itself determine that it wants to be a target UE and inform the network 352 by sending a message to the BS 356. Example reasons why UE 354a may choose or be selected by the network 352 to be a target UE include: low wireless channel quality between the UE 354a and the BS 356, many packets to be communicated between the BS 356 and the UE 354a, and/or the presence of a cooperating UE that is a good candidate for helping with communications between the BS 356 and the UE 354a.

UE 354a need not always stay a target UE. For example, UE 354a may lose its status as a target UE once there is no longer a need or desire for assistance with wireless communications between UE 354a and the BS 356. UE 354a may assist another target UE that is a cooperating UE at a later time. In general, a particular UE may sometimes be a target UE and other times may be a cooperating UE assisting another target UE. Also, sometimes a particular UE may be both a target UE receiving assistance from one or more cooperating UEs and also a cooperating UE itself assisting another target UE. In the examples below, the UE 354a acts only as a target UE, i.e., TUE 354a, and the UE 354b is a cooperating UE to the TUE 354a, i.e., CUE 354b.

FIG. 3 illustrates a system in which embodiments could be implemented. In some embodiments, a UE includes a processor, such as 376a, 376b in FIG. 3, and a non-transitory computer readable storage medium, such as 378a, 378b in FIG. 3, storing programming for execution by the processor. A non-transitory computer readable storage medium could also or instead be provided separately, as a computer program product.

In such embodiments, programming could include instructions to: receive, by the UE, a packet comprising a UE group identifier and further comprising a packet destination identifier that identifies a destination UE and determining, by the UE, if the UE is the destination UE. When the UE is the destination UE, the UE decoding the packet and when the UE is not the destination UE, the UE forwarding the packet to another UE.

Figure 4:
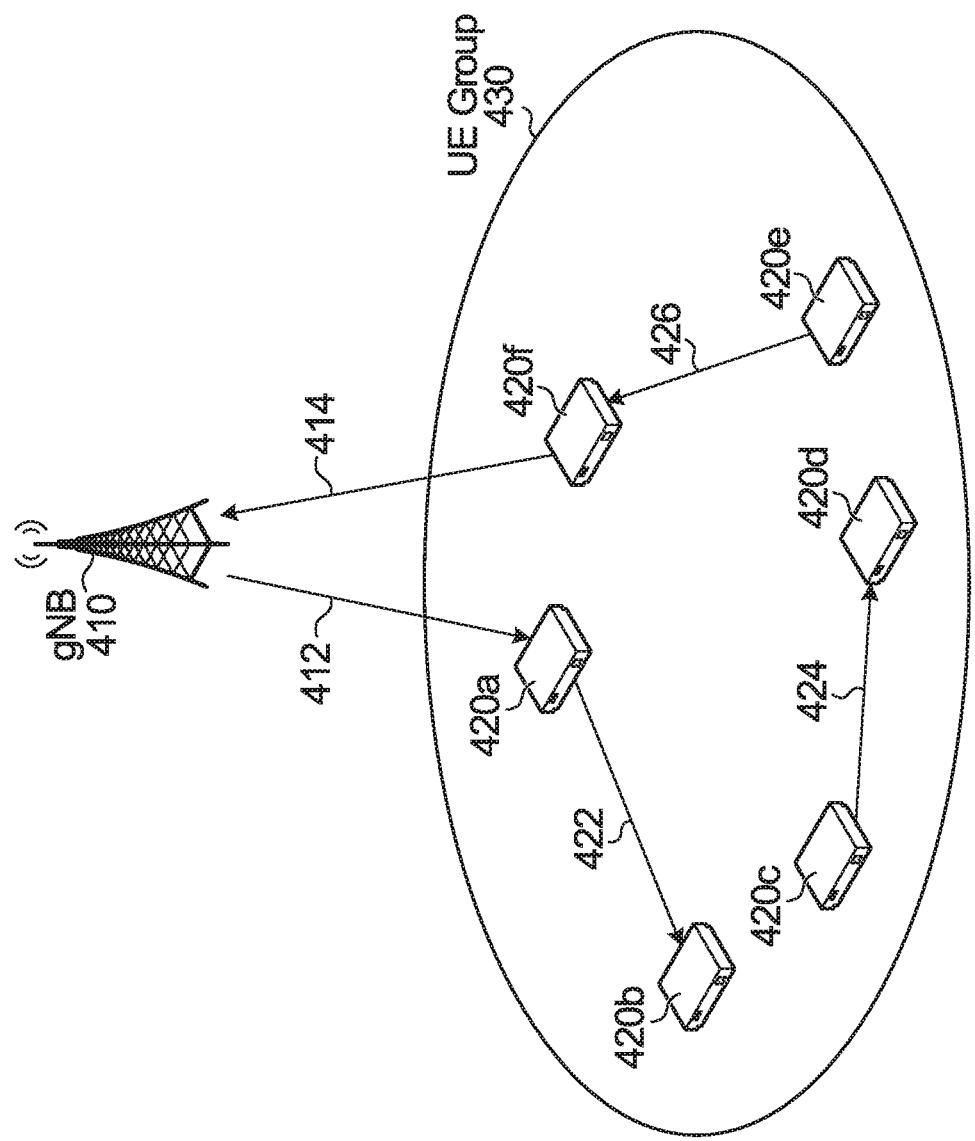
FIG. 4 is a schematic diagram of a communications between a base station and multiple user equipment in a UE group according to an embodiment of the present disclosure.

FIG. 4 illustrates three different types of packet transmissions that may occur between a base station and a group of UEs that are predefined as being in a same group. FIG. 4 includes a base station (gNB) 410 and several UEs (420a, 420b, 420c, 420d, 420e and 420f) that are part of UE group 430. The base station 410 can transmit and receive from UEs, for example as indicated by Uu downlink (DL) transmission 412 to UE 420a and by Uu uplink (UL) transmission 414 from UE 420f. The UEs can transmit and receive amongst themselves as indicated by sidelink (SL) transmission 422 between UE 420a and UE 420b, by SL transmission 424 between UE 420c and UE 420d and by SL transmission 426 between UE 420e and UE 420f. While SL transmissions 422, 424 and 426 are shown in a single direction, it is understood that the SL transmissions can be bidirectional.

Type #1: The Transmission is Between a Base Station and a UE in a Predefined UE Group The base station sends a packet in Uu DL by multicasting to a group of UEs. Transmission 412 in FIG. 4 is an example of this type of transmission. The cyclic redundancy code (CRC) of the packet can be scrambled by a target UE (TUE) ID or a group UE ID that is used to identify UEs in the predefined group of UEs. The TUE ID would typically by considered a type of global identifier of the UE that is the target destination of the packet. An example of this is a Radio Network Temporary Identifier (RNTI). The RNTI is a 16-bit long identifier that is assigned by the base station regardless of whether the UE is performing UE cooperation or not. The RNTI can be used to scramble the CRC and decoded information bits of the packet for the TUE. The UEs in the group could receive the packet and identify a destination for the packet, i.e. the destination UE. If the packet is not for the UE, the UE, acting as a cooperating UE (CUE), can forward the packet through amplify and forward (A-F) or decode and forward (D-F) methods. In some embodiments, the packet is forwarded using grant free (GF) transmission, also known as configured grant transmission. If a UE receives and identifies the packet is for itself, the UE can decode the packet. The target UE (TUE) can identify a source of the packet and send a Hybrid-Automatic Repeat Request (HARQ) acknowledgement (ACK) to the source, either directly or via one or more CUE.

Type #2: The Transmission is Between UEs within the UE Group

The UE(s) in the UE group can send a packet using SL to another UE. SL transmissions 422, 424 and 426 in FIG. 4 are examples of this type of transmission. In some embodiments this may including using a configured grant transmission. The CRC of the packet can be scrambled by a target UE (TUE) ID or the group UE ID. The UEs in the UE group can receive the packet and identify a destination for the packet. If the packet is not for the UE, the UE can forward the packet through A-F or D-F methods. In some embodiments, the packet is forwarded using configured grant transmission. If the UE receives and identifies the packet is for itself, the UE can decode the packet. The TUE can identify a source of the packet and send a HARQ ACK to the source, either directly or via one or more CUE.

Type #3: The Transmission is from a UE in a Predefined UE Group to a Base Station If the UE knows, or can determine, that the UE is within the coverage area of Uu UL, the UE can send the packet directly to the base station using Uu UL. Transmission 414 in FIG. 4 is an example of this type of transmission. In some embodiments, the packet is transmitted using configured grant transmission. If the UE in the UE group knows, or can determine, that the UE is not within the coverage area of Uu UL, the UE sends the packet using SL to one or more UEs. In some embodiments, the packet is transmitted using configured grant transmission. The CRC of the packet can be scrambled by the TUE ID, or the group UE ID. The UEs in the UE group can receive the packet and identify a destination for the packet. If the packet is not for the UE, the UE in the UE group can forward the packet through A-F or D-F methods. In some embodiments, the packet is forwarded using configured grant transmission. If the UE receives and identifies the packet is for the base station, and the UE is within the coverage area of Uu UL, the UE can transmit the packet directly to the base station using Uu UL. In some embodiments, the packet is transmitted using configured grant transmission.

The packets in these three types of transmissions could carry one of data or control information or a combination of data and control information from lower or higher layers.

In some embodiments of the present disclosure, as part of a UE cooperation process, a packet destination identifier, or packet destination ID for simplicity, is proposed to facilitate forwarding of packets for the three types of transmissions described above. The packet destination ID is used to indicate a final destination of the packet, i.e. the destination UE. The packet destination ID can be transmitted in any one of a number of different ways. The packet destination identifier is a relative identifier for the UE. It is intended for use when a UE is part of a group for UEs, in particular for UE cooperation. The packet destination identifier may be seen as a specific identifier with respect to the group of UEs. For example, if a group of UEs includes ten UEs, UE #1 could be assigned index #1, UE #2 could be assigned index #2, and so on. As a number of UEs in the group is typically a low number, the indices of the UEs can be captured by a bit length of, for example (but not intended to be limiting), 3 to 8 bits. In a particular example, 3 binary bits could be used to indicate a UE index for each UE in a group of eight UEs. The packet destination identifier is different from the UE RNTI, which is a global UE identifier. The packet destination identifier could be provided to other UEs in the group, without having to disclose the UE RNTI to other UEs. This has the benefit of lower overhead because of the small bit length of the packet destination identifier, as well as increased privacy because other UEs in the group are not provided with an explicit identifier of the UE, only a relative identifier of the packet destination. In some embodiments, the packet destination ID is embedded in the data portion or the control information portion of a physical channel such as a physical control channel or a physical shared data channel, or both, in the format of a self-contained bit field or code block. A bit combination could indicate one or multiple UE(s) in a UE group. For example, the bit combination may identify each UE using an index value associated with the UE that has been assigned within the UE group. If there were eight UEs in the UE group, a three bit combination could be used to identify each of the UEs. Alternatively, in some embodiments, a bit map could be used to indicate the UE index in a UE group. For example, if there are eight UE in the UE group, an eight-bit bit map, where each bit in the bit map represents a respective UE in the group, could be used to identify one or multiple UE in the group as the TUE.

In some embodiments, the packet destination ID is embedded in the data portion in a format of one of a set of self-contained sequences. In some embodiments, a single sequence in each set of sequences is used to identify one or multiple of the UEs in the UE group.

In some embodiments, the packet destination ID can be used to scramble demodulation reference signals (DMRS) sequences. In such a scenario, the packet destination identifier may be used to initiate a scrambling function to generate a DMRS sequence.

In some embodiments, the packet may also include a packet source identifier (ID) to indicate an original source of the packet, i.e. a base station or CUE. In some embodiments, the packet source ID is a relative and possibly temporary identifier in much the same way as the packet destination ID. When setting up the group of cooperating UEs, the base station may designate itself an index value to be included in the group. This index value could then be used as the packet source ID when the base station is the source of the packet. When a UE of the group of cooperating UEs is a source of the packet, the index designated by the base station for the UE can be used as the packet source ID. The packet source ID can be transmitted using similar alternatives as the packet destination ID, i.e. a bit field or code block, a sequence, or a DMRS sequence.

In some embodiments, the packet destination ID and the packet source ID use different resources. For example, different bit fields, different code block, different sequences, different scrambling sequences for the DMRS. Alternatively, the packet destination ID and the packet source ID could be coded jointly.

FIGS. 5A, 5B, 5C and 5D illustrate several different examples on how the packet destination ID and the packet source ID could be transmitted.

Each of FIGS. 5A, 5B, 5C and 5D illustrate a representation of a two dimensional time-frequency resource. Time is along the x-axis and frequency is along the y-axis. The time-frequency resource may be used for transmitting both data and control information.

Figure 5B:
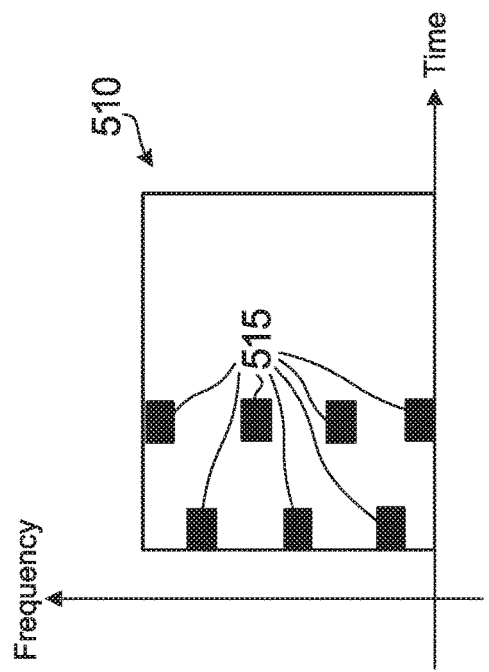
FIGS. 5A, 5B, 5C and 5D are examples of how a packet destination identifier or a packet source identifier can be transmitted in a time-frequency resource, according to embodiments of the present disclosure.
Figure 5D:
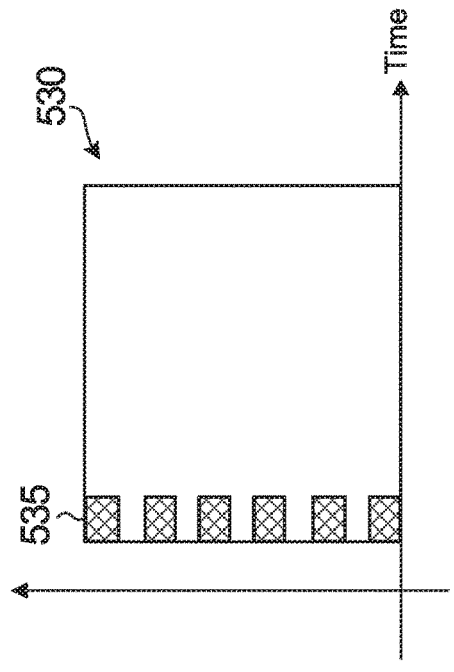
Figure 5A:
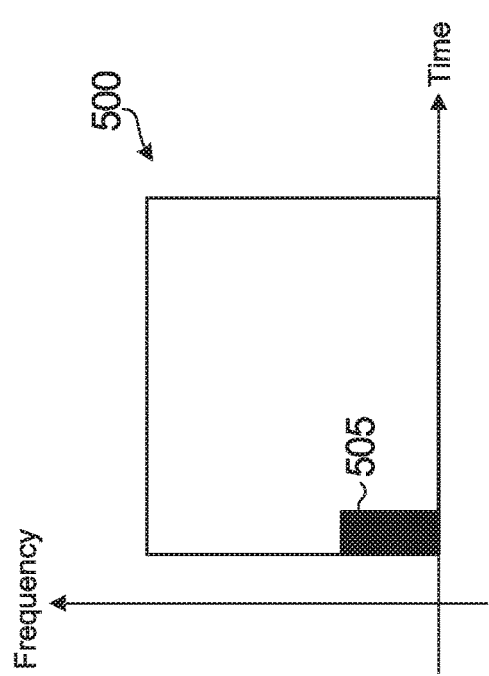

FIGS. 5A and 5B show that the packet destination ID, or the packet source ID, could be located in the data portion of the allocated resource. In some embodiments, the packet destination ID, or the packet source ID, may be within the physical downlink shared channel (PDSCH). The bit field or code block could either be localized in single location 505 of the allocated resource 500, as shown in FIG. 5A, or distributed within multiple portions 515 of the allocated resource 510, as shown in FIG. 5B. The bits that indicate the packet destination ID or the packet source ID could be either coded or not coded (as bit-field). If coded, the packet destination ID or the packet source ID could be located in a code block all together, as shown in FIG. 5A, or distributed in the data part, as shown in FIG. 5B in which the packet destination ID and/or the packet source ID are coded separately from the data or control information. In a scenario when the code block is localized, the code block could be located at the beginning of the data portion, such as in a first physical resource block (PRB) and a first symbol. In a scenario when the code block is distributed, the code block bits could be spread over a first symbol or across multiple symbols in a slot. In some embodiments, puncturing or rate matching could be applied to the data portion when the packet destination ID, or the packet source ID, is multiplexed into the data portion.

Figure 5C:
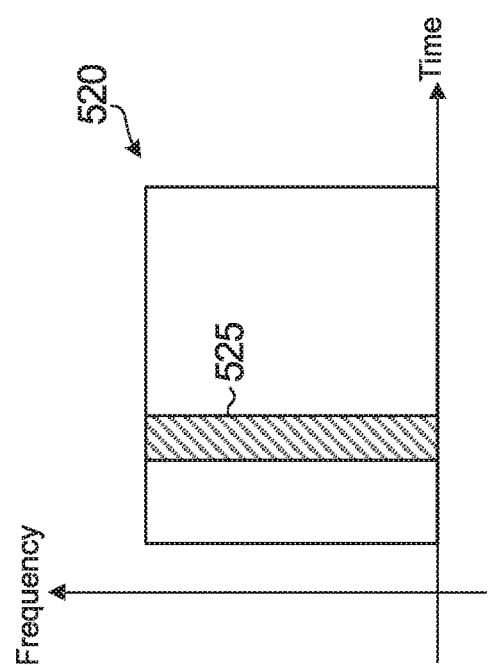

FIG. 5C shows an example in which one of a set of sequences can be used to indicate either of a packet destination ID or packet source ID. The sequence 525 is located in a allocated resource 520. While the sequence 525 is shown to encompass a symbol over the entire bandwidth of the allocated resource, this is only an example and it is to be understood that the sequence may encompass less than the entire bandwidth and may occur over multiple symbols. The slot may be, for example, a symbol. An example of a type of sequence is a Zadoff-Chu (ZC) sequence, but other types of sequences are contemplated. Different sequences within the set of sequences could be used to indicate respective packet destination IDs or source packet IDs. The sequence may be transmitted before the data portion starts or inserted into the data portion. The sequence may span a whole symbol or a portion of one or more symbols. In some embodiments, puncturing or rate matching could be applied to the data portion when the sequence is multiplexed into the data portion.

FIG. 5D shows an example of how DMRS 535 could be used to indicate either the packet destination ID or the source destination ID in the allocated resource 530. Generating the scrambled DMRS could be initiated by the packet destination ID, or the packet source ID, and thus the packet destination ID, or the source destination, can be derived from the received DMRS.

In some embodiments, the packet destination ID or the packet source ID could be derived by one or more parameters. A first example parameter is the target UE ID (for the packet destination ID) or the source UE ID (for the packet source ID). The target UE ID or the source UE ID may include a radio network temporary identifier (RNTI) or other higher layer configured identifier. A second example parameter is a target UE index or a source UE index of the UE group. A third example parameter is a group ID containing the target UE or the source UE. A fourth example parameter is a different ID that is assigned to the target UE or the source UE by the base station. A fifth example parameter is a HARQ process identifier (ID) of the transmission. A sixth example parameter is a cell ID or other identifier of the base station (or transmit receive point (TRP)) that is associated with the UE group on the Uu link.

Figure 6:
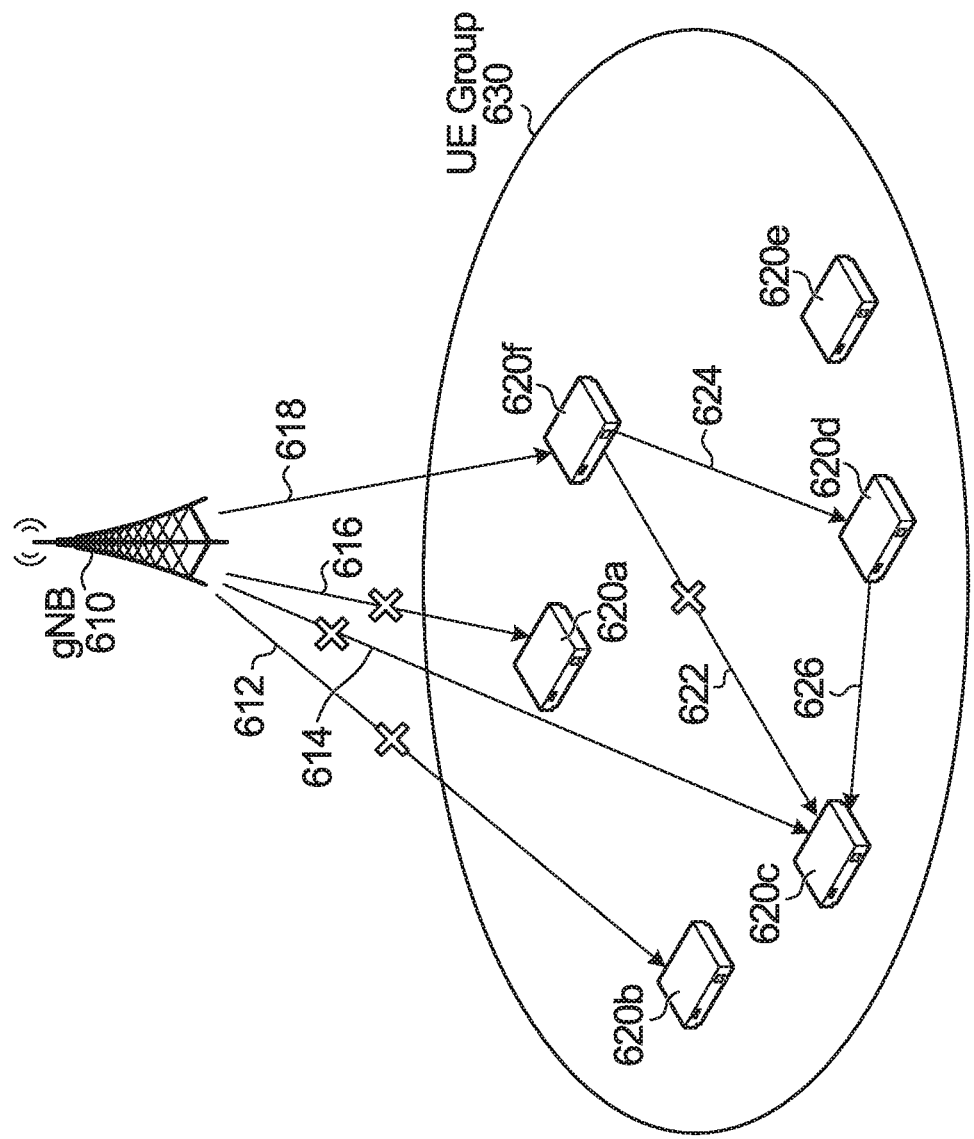
FIG. 6 is a schematic diagram showing an example of how UE cooperation occurs between a base station and multiple user equipment in a UE group according to an embodiment of the present disclosure.

With the use of packet destination ID or packet source ID, the procedure of packet transmission in a UE group can be implemented as described below, with reference to FIG. 6. FIG. 6 has a similar arrangement of network elements as FIG. 4, a base station 610 and six UEs 620a, 620b, 620c, 620d, 620e and 620f in a predefined UE group 630.

A preliminary process that occurs, but is not discussed in detail, is the organization of the group of UEs. Once the group has been defined or formed, the base station (gNB) 610 transmits a multicast message to the UEs of the group. This is shown in the form of multicast transmissions 612, 614, 616 and 618 from the base station 610 to UE 620b, UE 620c, UE 620a and UE 620f, respectively. Despite the multicast transmissions having different reference characters, this is for the purpose of describing the figure and it is to be understood that the multicast transmission is the same to all the UEs in the group. Multicast transmissions 612, 614, and 616 are not successfully received at UE 620b, UE 620c, UE 620a, respectively. However, multicast transmission 618 is successfully received at UE 620f. The unsuccessful reception of a packet here means the UE does not detect the control channel that schedules the packet of the data portion. After a packet is received by UE 620f, the UE 620f can identify whether the packet is for UE 620f or not, without decoding the entirety of packet. For example, the UE decodes at least the portion of the packet that includes the packet destination identifier. If the packet is for UE 620f, the UE can try to decode the packet. If not, the UE could forward the packet. In the example of FIG. 6, UE 620f determines that the packet is not for UE 620f and forwards the packet to other UEs, in this case UE 620c and UE 620d in transmissions 622 and 624, respectively. Such procedure will be repeated until the packet destination UE receives the packet and decodes it. Packet forwarding transmissions 622 is not successfully received at UE 620c. However, packet forwarding transmission 624 is successfully received at UE 620d. After the packet is received by UE 620d, the UE 620d can identify whether the packet is for UE 620d or not, without decoding the entirety of packet. UE 620d determines that the packet is not for UE 620d and forwards the packet to UE 620c in packet forwarding transmission 626. After the packet is received by UE 620c, the UE 620c identifies that the packet is for UE 620c. In some embodiments, the packet destination UE, in FIG. 6 this is 620c, determines the source of the packet by checking the packet source ID. The packet destination UE can feedback a HARQ-ACK to another UE in the group or to the base station, according to the packet source ID.

The UE cooperation strategies include strategies for handling degraded channel signals. For instance, one or more CUEs perform a decode and forward (D-F) strategy to support communications for one or more TUEs in the group of UEs. The one or more CUEs can also perform an amplify and forward (A-F) strategy to support the communications of the one or more TUEs. The strategies for degraded channel signals also include hierarchical modulation and/or coding. For example, a CUE receives and decodes a first modulated signal on a downlink and then forwards the first signal to a TUE, which also directly receives and decodes a second modulated signal (via a direct link from a BS). The TUE then combines the first and second signals to process the downlink data. This is referred to as soft combining. Similarly, two modulated signals (or more) on the uplink can be separately received by the network from a CUE and a TUE and then combined for processing.

The UE cooperation strategies also include strategies for handling non-degraded channel signals. Such strategies include joint reception on the downlink between one or more CUEs and one or more TUEs in the group of UEs, for example using log-likelihood ratio (LLR) combining or multiple-input and multiple-output (MIMO) schemes. The strategies for non-degraded channel signals also include joint transmission on the uplink between one or more TUEs and one or more CUEs, such as using Eavesdrop or HARQ schemes. The CUEs with the TUEs may switch between any of the UE cooperation strategies above based on the network channel conditions, e.g., according to whether degraded or non-degraded channel signals are detected. In an embodiment, a CUE estimates a channel between the CUE and the network and forwards the estimated channel to a corresponding TUE. The TUE also estimates a channel between the TUE and the network, and then combines the channels to obtain a combined channel for joint reception/transmission.

Figure 7:
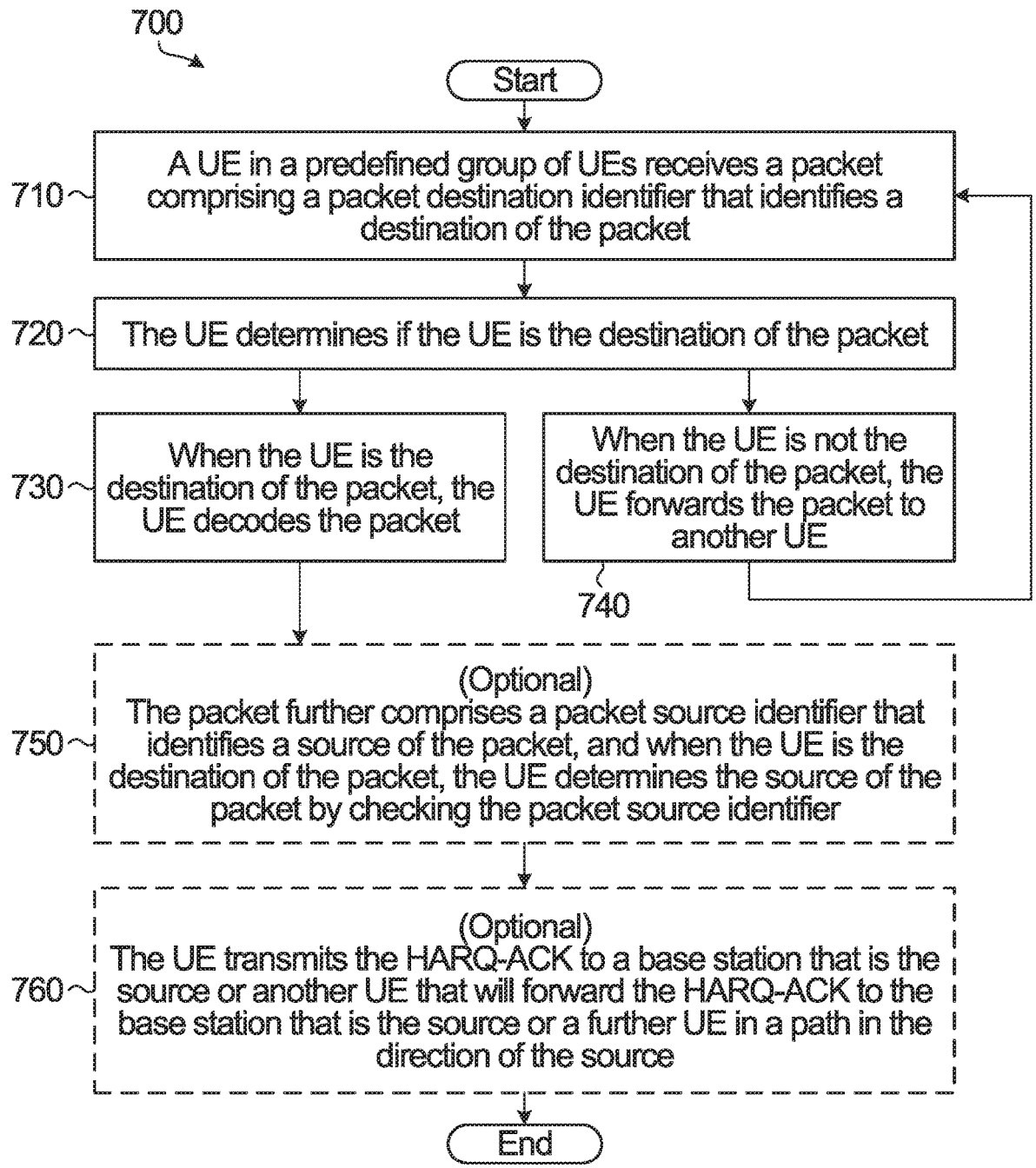
FIG. 7 is a flow chart illustrating an example method performed by a UE according to an embodiment of the present disclosure.

FIG. 7 is an example flow diagram 700 that describes a method of how UE cooperation can be performed in accordance with an aspect of this disclosure. At 710, a UE in a predefined group of UEs receives a packet comprising a packet destination identifier that identifies a destination of a packet. At 720, the UE determines whether the UE is the destination of the packet. If the UE is not the destination of the packet, at 740 the UE forwards the packet to another UE. After 740, the UE that receives the packet is a new UE so the process returns to 710.

If the UE is the destination of the packet, at 730 the UE decodes the packet. After the UE has decoded the packet in 730, the UE optionally determines the source of the packet at 750 by checking a packet source identifier that is part of the packet. At 760, the UE optionally transmits the HARQ-ACK to a base station that is the source or another UE that will forward the HARQ-ACK to the base station that is the source or a further UE in a path in the direction of the source.

Figure 8:
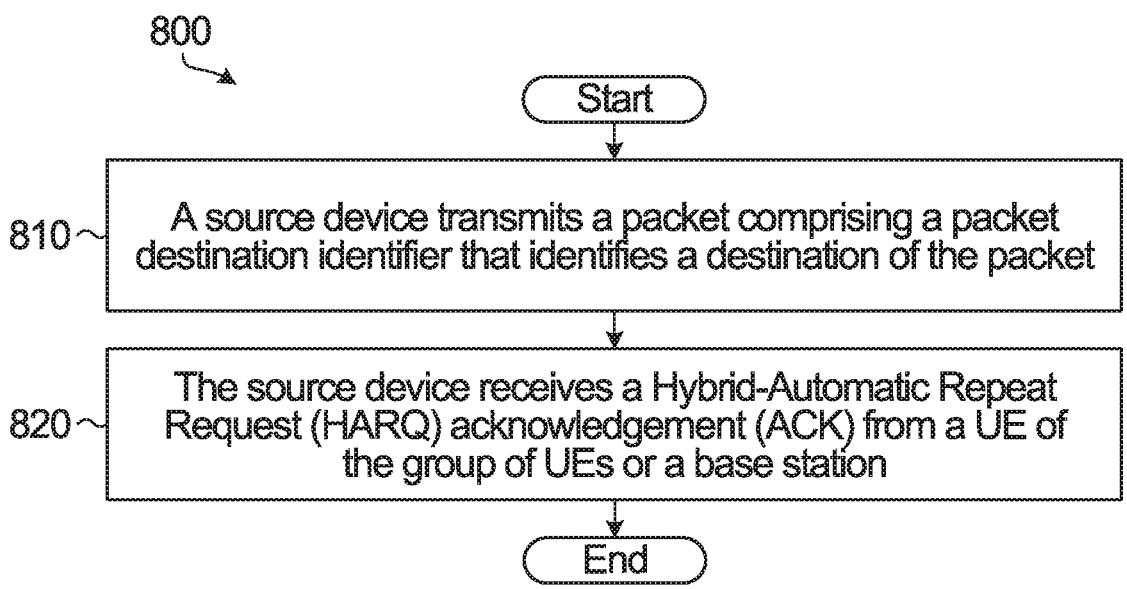
FIG. 8 is a flow chart illustrating an example method performed by a base station according to an embodiment of the present disclosure.

FIG. 8 is an example flow diagram 800 that describes a method of how UE cooperation can be performed in accordance with an aspect of this disclosure. At 810, a source device transmits a packet comprising a packet destination identifier that identifies a destination. The source device could be a base station transmitting to a UE or group of UEs or a UE transmitting to one or more UEs or a base station. At 820, the source device receives a Hybrid-Automatic Repeat Request (HARQ) acknowledgement (ACK) from a UE of the group of UEs or a base station.

One possible application of sidelink (SL) communications is vehicle to everything/anything (V2X) communication, for example, which is an increasingly important new category of communication that may become widespread in next generation wireless communication networks, such as 5G New Radio (NR) systems. V2X refers to a category of communication scenarios, including communication from a vehicle to another vehicle (V2V), vehicle to infrastructure (V2I), and vehicle to pedestrian (V2P), for example. In general, a vehicle communicating in a network is considered user equipment (UE).

The communication in V2X systems may be performed using links between the network and the UE, such as an uplink (UL) and a downlink (DL). The UL is a wireless communication from a UE to a base station (BS), and the DL is a wireless communication from a BS to a UE. In V2V communication using the UL and DL, data is transmitted from a transmitting UE to a BS, and then transmitted from the BS to a receiving UE.

Alternatively, some of the V2X communication scenarios may be device to device (D2D) communications, in which case the transmission in V2X systems may be performed between the transmitting UE and receiving UE using a sidelink (SL). The SL allows data to be transmitted directly from the transmitting UE to the receiving UE, without forwarding the data via the BS.

In general, the SL and UE cooperation may enhance the reliability, throughput, and capacity of any wireless communications. However, successful UE cooperation requires proper management of the SL between CUEs and TUEs in order to reduce interference and improve UE cooperation benefits.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

According to a first example of the present disclosure, there is provided a method for User Equipment (UE) cooperation. The method involves a UE in a predefined group of UEs receiving a packet comprising a packet destination identifier that identifies a destination of the packet and the UE determining whether the UE is the destination of the packet. When the UE is the destination of the packet, the UE decodes the packet. When the UE is not the destination of the packet, the UE forwards the packet to another UE or a base station.

According to a further embodiment of the first example, the method includes the UE determining if the UE is the destination of the packet is performed without having to decode the entire packet.

According to a further embodiment of the first example, the packet further includes a UE group identifier or a target UE identifier (TUE ID).

According to a further embodiment of the first example, the TUE ID is a Radio Network Temporary Identifier (RNTI) of the target UE.

According to a further embodiment of the first example, the packet further includes a packet source identifier that identifies a source of the packet, and when the UE is the destination of the packet, the UE determining the source of the packet by checking the packet source identifier.

According to a further embodiment of the first example, the method further involves, after successfully decoding the packet, the UE transmitting a Hybrid-Automatic Repeat Request (HARQ) acknowledgement (ACK) to the source of the packet.

According to a further embodiment of the first example, the method further involves, the UE transmitting the HARQ-ACK to: a base station that is the source of the packet; or another UE that will forward the HARQ-ACK to the base station that is the source of the packet or a further UE in a path in the direction of the source of the packet.

According to a further embodiment of the first example, the method further involves, the UE receiving a Hybrid-Automatic Repeat Request (HARQ) acknowledgement (ACK) from the another UE.

According to a further embodiment of the first example, forwarding the packet to the another UE includes: amplifying the packet and forwarding the packet to the another UE; or decoding the packet, re-encoding the packet and forwarding the packet to the another UE.

According to a further embodiment of the first example, the packet comprises data or control information, or both.

According to a further embodiment of the first example, the packet destination identifier is included in a self-contained bit field or code block.

According to a further embodiment of the first example, the self-contained bit field or code block identifies one or more UEs in the group of UEs as destinations of the packet.

According to a further embodiment of the first example, the self-contained bit field or code block is either: localized in a single portion of a data transmission; or distributed in multiple portions across a data transmission.

According to a further embodiment of the first example, the packet destination identifier is included in self-contained sequence of a set of self-contained sequences in a data portion.

According to a further embodiment of the first example, the self-contained sequence: spans less than one symbol; spans one symbol; or spans more than one symbol.

According to a further embodiment of the first example, the self-contained sequence multiplexes with or punctures in the data portion.

According to a further embodiment of the first example, the packet destination identifier is included in a scrambled demodulation reference signal (DMRS).

According to a further embodiment of the first example, the packet source identifier is included in a self-contained bit field or code block.

According to a further embodiment of the first example, the self-contained bit field or code block identifies one or more UEs in the group of UEs as destinations of the packet.

According to a further embodiment of the first example, the self-contained bit field or code block is either: localized in a single portion of a data transmission; or distributed in multiple portions across a data transmission.

According to a further embodiment of the first example, the packet source identifier is included in self-contained sequence of a set of self-contained sequences in a data portion.

According to a further embodiment of the first example, the self-contained sequence: spans less than one symbol; spans one symbol; or spans across more than one symbol.

According to a further embodiment of the first example, the self-contained sequence multiplexes with or punctures in the data portion.

According to a further embodiment of the first example, the packet source identifier is included in a scrambled demodulation reference signal (DMRS).

According to a further embodiment of the first example, the packet destination identifier and the source identifier are transmitted on different transmission resources.

According to a further embodiment of the first example, the packet destination identifier and the source identifier are received on different transmission resources.

According to a further embodiment of the first example, the packet is transmitted or received on a resource by a configured grant transmission.

According to a further embodiment of the first example, the packet destination identifier or the packet source identifier, or both, is derived by one or more of the following parameters: a radio network temporary identifier (RNTI) or higher layer configured identifier (ID); a target UE index or a source UE index, or both, in the UE group; a group ID comprises a target UE, or a source UE, or both; another identifier type that is assigned by the base station to the target ID or source ID, or both; a Hybrid-Automatic Repeat Request (HARQ) process ID of a transmission including the packet; and a cell ID or an indication of the base station that is associated with UE group on a base station to UE link.

According to a second example of the present disclosure, there is provided a method for User Equipment (UE) cooperation. The method involves a source device transmitting a packet comprising a packet destination identifier that identifies a destination UE in a group of UEs or a base station and the source device receiving a Hybrid-Automatic Repeat Request (HARQ) acknowledgement (ACK) from a UE of the group of UEs or the base station.

According to a further embodiment of the second example, the source device is: a base station; or a UE.

According to a further embodiment of the second example, the UE is either: a destination UE; or a UE that has received the HARQ-ACK from the destination UE or a UE in a path from the destination UE.

According to a further embodiment of the second example, the method further involves, a UE group identifier or a target UE identifier (TUE ID).

According to a further embodiment of the second example, the TUE ID is a Radio Network Temporary Identifier (RNTI) of the target UE.

According to a further embodiment of the second example, the packet further includes a packet source identifier that identifies the source device as a source of the packet.

According to a further embodiment of the second example, the packet includes data or control information, or both.

According to a further embodiment of the second example, the packet destination identifier is included in a self-contained bit field or code block.

According to a further embodiment of the second example, the self-contained bit field or code block indicates one or more UEs in the group of UEs as destinations of the packet.

According to a further embodiment of the second example, the self-contained bit field or code block is either: localized in a single portion of a data transmission; or distributed in multiple portions across a data transmission.

According to a further embodiment of the second example, the packet destination identifier is included in a self-contained sequence of a set of self-contained sequences in a data portion.

According to a further embodiment of the second example, the self-contained sequence: spans less than a one symbol; spans one symbol; or spans across more than one symbol.

According to a further embodiment of the second example, the self-contained sequence multiplexes with or punctures in the data portion.

According to a further embodiment of the second example, the packet destination identifier is included in a scrambled demodulation reference signal (DMRS).

According to a further embodiment of the second example, the packet source identifier is included in a self-contained bit field or code block.

According to a further embodiment of the second example, the self-contained bit field or code block indicates one or more UEs in the group of UEs as destinations of the packet.

According to a further embodiment of the second example, the self-contained bit field or code block is either: localized in a single portion of a data transmission; or distributed in multiple portions across a data transmission.

According to a further embodiment of the second example, the packet source identifier is included in a self-contained sequence of a set of self-contained sequences in a data portion.

According to a further embodiment of the second example, the self-contained sequence: spans less than a one symbol; spans one symbol; or spans more than one symbol.

According to a further embodiment of the second example, the self-contained sequence multiplexes with or punctures in the data portion.

According to a further embodiment of the second example, the packet source identifier is included in a scrambled demodulation reference signal (DMRS).

According to a further embodiment of the second example, the packet destination identifier and the source identifier are transmitted on different transmission resources.

According to a further embodiment of the second example, the HARQ-ACK is received on a resource by configured grant transmission.

According to a further embodiment of the second example, when the source device is a UE, the UE transmitting to: another UE in the group of UEs; or a base station.

According to a third example of the present disclosure, there is provided a User Equipment (UE) for use in UE cooperation with a group of UEs. The UE includes a processor; and a computer-readable medium having stored thereon computer-executable instructions. When executed by the processor, the computer-executable instructions cause the UE to: receive a packet comprising a packet destination identifier that identifies a destination of the packet and determine whether the UE is the destination of the packet. When the UE is the destination of the packet, the UE decodes the packet. When the UE is not the destination of the packet, the UE forwards the packet to another UE or a base station.

According to a further embodiment of the third example, the packet further includes a packet source identifier that identifies a source of the packet, and when the UE is the destination of the packet, the computer-executable instructions are configured to determine the source of the packet by checking the packet source identifier.

According to a further embodiment of the third example, after successfully decoding the packet, the computer-executable instructions are configured to transmit a Hybrid-Automatic Repeat Request (HARQ) acknowledgement (ACK) to the source of the packet.

According to a further embodiment of the third example, the UE is configured to transmit the HARQ-ACK to: a base station that is the source of the packet; or another UE that will forward the HARQ-ACK to the base station that is the source of the packet or a further UE in a path in the direction of the source of the packet.

According to a further embodiment of the third example, the UE is configured to receive a Hybrid-Automatic Repeat Request (HARQ) acknowledgement (ACK) from the another UE.

According to a fourth example of the present disclosure, there is provided a source device for use in UE cooperation with a group of UEs. The source device includes a processor; and a computer-readable medium having stored thereon computer-executable instructions. When executed by the processor, the computer-executable instructions cause the source device to: transmit a packet comprising a packet destination identifier that identifies a destination UE in a group of UEs or a base station; and receive a Hybrid-Automatic Repeat Request (HARQ) acknowledgement (ACK) from a UE of the group of UEs or the base station.

According to a further embodiment of the fourth example, the source device is: a base station; or a UE.

According to a further embodiment of the fourth example, when the source device is a UE, the UE transmitting to: another UE in the group of UEs; or a base station.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
   receiving, by a first user equipment (UE) of a group of UEs, a packet comprising a packet destination identifier that uniquely identifies a destination of the packet; and
   forwarding, by the first UE, the packet to a second UE or a base station based on the packet destination identifier,
   wherein the packet destination identifier uniquely identifies the second UE within the group of UEs as a final destination of the packet or uniquely identifies the base station as the destination of the packet,
   wherein the packet destination identifier is embedded in a data portion of the packet and carried in one or more locations of allocated resources within a physical downlink shared channel (PDSCH) for the data portion of the packet, and
   wherein the packet destination identifier is different from a radio network temporary identifier (RNTI).

2. The method of claim 1, wherein the packet destination identifier is included in a self-contained bit field or code block of the packet, the self-contained bit field or code block for uniquely identifying the second UE within the group of UEs or the base station as the destination of the packet.

3. The method of claim 2, wherein the self-contained bit field or code block is multiplexed with the data portion of the packet by puncturing or rate matching the data portion.

4. The method of claim 1, wherein the packet destination identifier is included in a self-contained sequence, of a set of self-contained sequences, in the data portion of the packet, the self-contained sequence for uniquely identifying the second UE within the group of UEs or the base station as the destination of the packet.

5. The method of claim 4, wherein the self-contained sequence is multiplexed with the data portion by puncturing or rate matching the data portion.

6. The method of claim 1, wherein the packet destination identifier is included in a scrambled demodulation reference signal (DMRS) for uniquely identifying the second UE within the group of UEs or the base station as the destination of the packet.

7. The method of claim 1, wherein the packet further comprises a packet source identifier that identifies a source of the packet, and the packet source identifier is included in a self-contained bit field or code block of the packet, the self-contained bit field or code block for identifying the base station or one UE in the group of UEs as the source of the packet.

8. The method of claim 1, wherein the packet further comprises a packet source identifier that identifies a source of the packet, and the packet source identifier is included in a self-contained sequence, of a set of self-contained sequences, in the data portion of the packet, the self-contained sequence for identifying the base station or one UE in the group of UEs as the source of the packet.

9. The method of claim 8, wherein the self-contained sequence is multiplexed with the data portion by puncturing or rate matching the data portion.

10. The method of claim 1, wherein the packet further comprises a packet source identifier that identifies a source of the packet, and wherein the packet source identifier is included in a scrambled demodulation reference signal (DMRS) for identifying the base station or one UE in the group of UEs as the source of the packet.

11. The method of claim 1, wherein the packet further comprises a UE group identifier or a target UE (TUE) identifier (ID).

12. A user equipment (UE) comprising:
    at least one processor; and
    a non-transitory computer-readable medium having stored thereon computer-executable instructions, that when executed by the at least one processor, cause the UE to:
    receive a packet comprising a packet destination identifier that uniquely identifies a destination of the packet; and
    forward the packet to a second UE or a base station based on the packet destination identifier,
    wherein the packet destination identifier uniquely identifies the second UE within a group of UEs as a final destination of the packet or uniquely identifies the base station as the destination of the packet,
    wherein the packet destination identifier is embedded in a data portion of the packet and carried in one or more locations of allocated resources within a physical downlink shared channel (PDSCH) for the data portion of the packet, and
    wherein the packet destination identifier is different from a radio network temporary identifier (RNTI).

13. The UE of claim 12, wherein the packet destination identifier is included in a self-contained bit field or code block of the packet, the self-contained bit field or code block for uniquely identifying the second UE within the group of UEs or the base station as the destination of the packet.

14. The UE of claim 13, wherein the self-contained bit field or code block is multiplexed with the data portion of the packet by puncturing or rate matching the data portion.

15. The UE of claim 12, wherein the packet destination identifier is included in a self-contained sequence, of a set of self-contained sequences, in the data portion of the packet, the self-contained sequence for uniquely identifying the second UE within the group of UEs or the base station as the destination of the packet.

16. The UE of claim 15, wherein the self-contained sequence is multiplexed with the data portion by puncturing or rate matching the data portion.

17. The UE of claim 12, wherein the packet destination identifier is included in a scrambled demodulation reference signal (DMRS) for uniquely identifying the second UE within the group of UEs or the base station as the destination of the packet.

18. The UE of claim 12, wherein the packet further comprises a packet source identifier that identifies a source of the packet, and the packet source identifier is included in a self-contained bit field or code block of the packet, the self-contained bit field or code block for identifying the base station or one UE in the group of UEs as the source of the packet.

19. The UE of claim 12, wherein the packet further comprises a packet source identifier that identifies a source of the packet, and the packet source identifier is included in a self-contained sequence, of a set of self-contained sequences, in the data portion of the packet, the self-contained sequence for identifying the base station or one UE in the group of UEs as the source of the packet.

20. The UE of claim 19, wherein the self-contained sequence is multiplexed with the data portion by puncturing or rate matching the data portion.

21. The UE of claim 12, wherein the packet further comprises a packet source identifier that identifies a source of the packet, and wherein the packet source identifier is included in a scrambled demodulation reference signal (DMRS) for identifying the base station or one UE in the group of UEs as the source of the packet.

22. The UE of claim 12, wherein the packet further comprises a UE group identifier or a target UE identifier (TUE ID).

* * * * *